United States Patent [19]

Wells, Jr. et al.

[11] 4,438,290
[45] Mar. 20, 1984

[54] FAST RESPONSE THERMOCOUPLE SURFACE PROBE

[75] Inventors: Alfred E. Wells, Jr., Rochelle Park; James H. Casillo, Towaco, both of N.J.

[73] Assignee: Thermo Electric Co., Inc., Saddle Brook, N.J.

[21] Appl. No.: 388,695

[22] Filed: Jun. 15, 1981

[51] Int. Cl.³ .......................................... H01L 35/28
[52] U.S. Cl. .................................... 136/221; 136/201; 136/230; 136/236 R; 374/179; 29/573
[58] Field of Search ................... 29/573; 136/201, 208, 136/221, 225, 230, 235, 236; 374/179

[56] References Cited

U.S. PATENT DOCUMENTS

| | | | |
|---|---|---|---|
| 1,241,496 | 10/1917 | Chubb | 136/221 |
| 2,282,441 | 5/1942 | Whitlock | 136/221 X |
| 2,997,513 | 8/1961 | Rall et al. | 136/201 |
| 3,099,575 | 7/1963 | Hill | 136/230 X |
| 3,283,580 | 11/1966 | Nanigian et al. | 136/230 |
| 3,321,974 | 5/1967 | Sterbutzel | 136/221 X |
| 3,417,618 | 12/1968 | Morrisette | 374/179 |
| 4,242,148 | 12/1980 | Remmert | 136/221 X |
| 4,259,123 | 3/1981 | Tymkewicz | 136/221 |
| 4,265,117 | 5/1981 | Thoma et al. | 136/221 |

*Primary Examiner*—Leland A. Sebastian
*Attorney, Agent, or Firm*—Arthur L. Plevy

[57] ABSTRACT

A fast response thermocouple probe is formed from two strips of different resilient thermocouple metals. The strips each have a bowed portion with the bowed portions overlapping and crossing each other at a spot welded junction point. The ends of each strip are connected together and engage a body member so that the bowed portions are spaced from the body. The strips are bent to form leaf springs thereby allowing for a resilient junction.

9 Claims, 4 Drawing Figures

U.S. Patent  Mar. 20, 1984  4,438,290
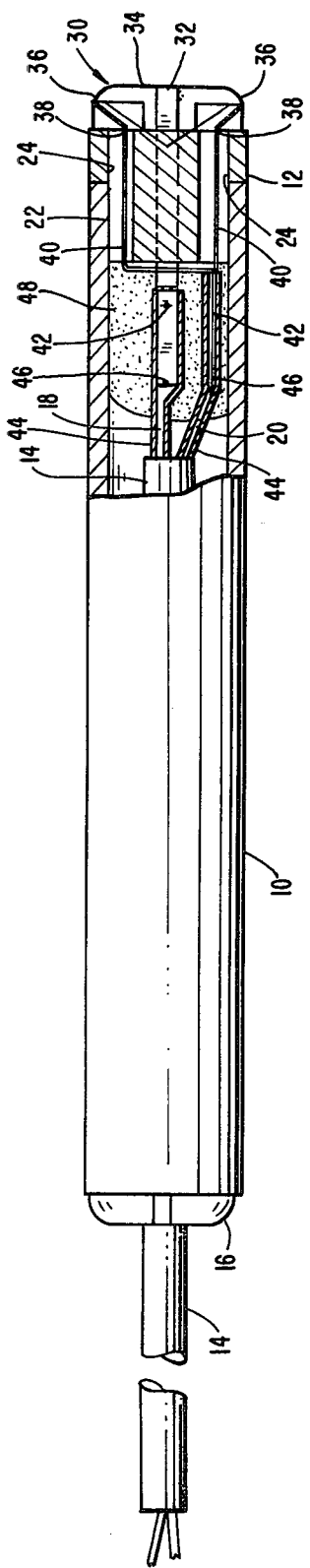
FIG. I
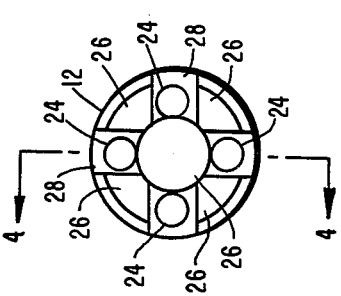
FIG. 4
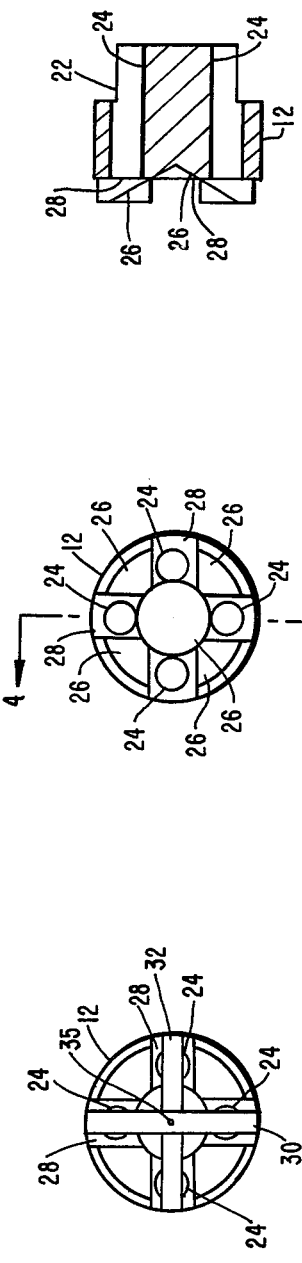
FIG. 3
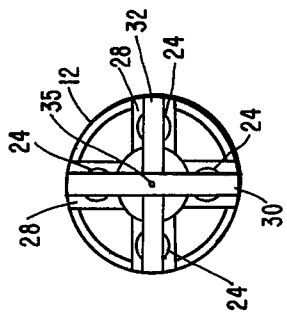
FIG. 2

4,438,290

FAST RESPONSE THERMOCOUPLE SURFACE PROBE

BACKGROUND OF THE INVENTION

1. Field of the Invention

The present invention relates to thermocouple probes and more particularly to a fast response hand-held surface probe.

2. Description of the Prior Art

Heretofore thermocouple surface probes having acceptable response times and accuracies have been difficult to manufacture and as a result have been too expensive for many applications. Examples of such devices may be found in U.S. Pat. Nos. 3,395,050; 3,573,995; and 4,279,154. To assure good contact with the surface, the temperature of which is to be measured, spring members were used to urge the thermocouple junction against the surface. At times these spring members became quite elaborate since the mass of the spring could not be near the junction or it would act as a heat sink resulting in erroneous temperature readings. In most cases the thermocouple junction was formed by butt welding the ends of two strips of thermocouple metals. The junction was usually formed on a bias necessitating machining of the ends prior to welding and subsequent dressing of the junction to remove burrs or bumps resulting from the welding operation.

In an effort to reduce the cost of the welding and machining operations, attempts were made to form the junction by overlapping the metals and spot welding them together. Examples of these types of devices are shown in U.S. Pat. Nos. 2,282,441 and 3,283,580. The difficulty associated with this type of structure was lack of good contact with the surface. The overlapped metal reduced the metal area in contact with the surface and the structure provided insufficient contact pressure.

U.S. Pat. No. 3,099,575 shows a thermocouple probe wherein film ribbons of thermocouple metals are deposited on a refractory rod with the junction formed at the crossing of the film ribbons. The film is deposited directly on the rod so that the rod acts as a heat sink. Such a structure is not appropriate for a hand-held surface probe and must be used in permanent locations since response time is slow.

SUMMARY OF THE INVENTION

The present invention contemplates a structure that is inexpensive to manufacture while providing acceptable response time and accuracy. These desirable characteristics are realized by uniquely using a pair of leaf springs, each formed of a different thermocouple metal. Said leaf springs being positioned to cross each other and form a thermocouple junction at the crossing. The springs are spot welded at the junction to provide good electrical contact and to prevent separation.

Through the use of an overlapped and spot welded junction, the need for machining and dressing is eliminated. Using crossed strips of thermocouple metal to form the junction essentially doubled the area of thermocouple material in contact with the surface as compared with a mere overlapped junction as in the prior art. The use of resilient thermocouple metals in the form of crossed leaf springs provides good surface contact and pressure without the need for elaborate and expensive spring arrangements or backing material that would act as a heat sink.

A primary objective of the invention is to provide an inexpensive hand-held thermocouple probe.

Another objective is to provide a thermocouple junction formed by crossed strips of thermocouple metal in the form of leaf springs.

These and other objectives and advantages of the invention will become apparent from the following description when taken in conjunction with the accompanying drawings illustrating the invention.

DESCRIPTION OF THE DRAWINGS

FIG. 1 is a partial section showing a hand-held thermocouple surface probe constructed in accordance with the invention.

FIG. 2 is an end view of the probe of FIG. 1.

FIG. 3 is an end view of a tip member.

FIG. 4 is a section of the tip member of FIG. 3 taken along line 4—4.

DESCRIPTION OF THE INVENTION

Referring to FIG. 1 there is shown the hand-held thermocouple surface probe of the present invention having a tubular handle portion 10 made preferably of a suitable plastic material. Disposed in one end of handle 10 is a tip member 12 machined of an insulating material such as PTFE. A wire 14 extends into handle 10 through a strain relief bushing 16. Wire 14 includes two stranded insulated wire conductors 18 and 20, each made of a different thermocouple wire as for example ALUMEL and CHROMEL.

The tip member 12 is shown more clearly in FIGS. 3 and 4. Member 12 is cylindrical having a reduced diameter stepped portion 22 sized to fit in the end of handle 10. Four holes 24 are formed through member 12 and are equally spaced ninety degrees apart. A conical surface 26 is formed in one end of member 12. Said conical surface may be formed by a drill tip having a diameter slightly smaller than that of member 12. Two crossed slots 28 are then milled acrossed the conical surface and are positioned to intersect the holes 24. Slots 28 have a depth of about one-half the depth of the conical surface 26.

Prior to mounting tip member 12 into handle 10, leaf springs 30 and 32 are formed and assembled to member 12. Leaf springs 30 and 32 are formed of two different thermocouple metals which must be the same metals used for stranded conductors 18 and 20, such as ALUMEL and CHROMEL. If the leaf springs are formed of metals different from the conductor metals, additional junctions will be formed resulting in inaccurate temperature readings. The metals must be resilient and provided in strips of convenient width and thickness. A width of 0.062 inch and thickness of 0.004 inch was found to be acceptable.

Each strip is bent as shown in FIG. 1 to have a bowed portion 34 generally near the center of the strip. For a probe having a one-half inch diameter the bowed portion may have a radius of approximately one and one-half inches. Reversing bends 36 are formed at each end of the bowed portion 34, said bends may have a radius of approximately 0.01 inch. Bends 38 are then formed at positions on the strips to define end portions 40 that are parallel and spaced apart a distance equal to the spacing between opposite holes 24 formed in tip member 12.

The strips forming leaf springs 30 and 32 are crossed at the centers of the bowed portions 34 and spot welded together at 35. The leaf springs are assembled to tip member 12 by inserting the four portions 40 into and through holes 24. One end portion of leaf spring 30 is bent across the inner end of tip member 12 and is bent a second time to lie in juxtaposition with the other end portion of leaf spring 30. The end portions are then spot welded as at 42. The end portions of leaf spring 32 are treated in like manner except that the first bend is spaced from the inner end of tip member 12 to avoid contact with leaf spring 30.

A sleeve 44 is slipped over each of the conductors 18 and 20 after which the stranded metal conductors are silver soldered to the ends of the leaf springs 30 and 32 as at 46. After soldering is completed the sleeves 44 are slipped back over the solder joint and the juxtaposed portions of the end portions as shown in FIG. 1. An insulating potting compound 48 is placed around the end portions of the leaf springs to assure separation of the springs and to secure the leaf springs to the tip member. The tip member may then be inserted into handle 10 and secured in place using any convenient means.

When in use the leaf springs 30 and 32 provide a large surface contact area for the thermocouple metals since they both extend across the entire diameter of the probe. Thus, the junction rapidly reaches the temperature of the surface resulting in a fast response device. By using two complete leaf springs to form the junction, good surface contact pressure is provided even though the junction does not make contact with any backing material. Thus, there is no heat sink effect to draw heat from the junction. Slots 28 allow the leaf springs to flatten and expand outwardly to provide good spring action. The segments of the outer peripheral edge of the tip member between the slots function as a stop to limit the compression of the springs when contact is made with the surface, the temperature of which is being measured. Thus, the user of the probe need not take any special precautions to prevent probe damage from using too much force.

The described structure is inexpensive to manufacture but provides a thermocouple that has a fast response time and acceptable accuracy.

What is claimed is:

1. A thermocouple, comprising:
a cylindrical body having a top surface with said top surface having first and second transverse crossing slots, with a first strip of resilent thermocouple material of a first type having end portions extending from the top surface towards the bottom surface of said body and having a bowed central portion positioned above and parallel to said first slot, to form a leaf type spring, a second strip of resilent thermocouple material of a second type having end portions directed from the top surface to the bottom surface of said body and having a bowed central positioned above and parallel to said second slot to form a leaf type spring, whereby said bowed central portions are transvere to and cross each other and as crossing are in contact to form a thermocouple portion with said slots operative to allow said bowed portions to flatten and expand outwardly without contracting said body via the spring action when said strips are forced against a surface upon which a temperature measurement is to be made.

2. The thermocouple as described in claim 1 wherein the bowed portions are spot welded to contact each other.

3. The thermocouple as described in claim 1 wherein the first and second end of each of said strips are connected together at said bottom surface of said housing.

4. The thermocouple as described in claim 1 wherein said top surface of said top body housing includes a conical central depression overlying said slots.

5. The thermocouple according to claim 1 wherein each slot is associated with first and second spaced apart passageways directed from said top surface to said bottom surface of said housing with the end portions of each of said strips solely located in an associated passageway to allow said bowed central portion to be positioned above and parallel to said associated slot and means connecting the two end portions of each strip together within said housing.

6. The thermocouple according to claim 1 wherein said strips each have a pair of reversing bonds at the ends of the bowed portions to provide increased spring action.

7. The thermocouple according to claim 1 wherein said cylindrical body includes a handle portion having an internal hollow with the slotted top surface defining a tip portion.

8. A thermocouple as described in claim 5, wherein the strips each have a pair of reversing bends at the ends of the bowed portions so that the strips extend inwardly toward the passageways where they are again bent and extend through said passageway.

9. A thermocouple as described in claim 8 additionally comprising:
a pair of thermocouple wires extending through said handle portion and connected to said connected ends of the strips; and
insulating means for preventing contact between said pairs of wires and strip ends.

* * * * *